March 3, 1964 SÁNDOR BARNA 3,123,515
NOW BY JUDICIAL CHANGE OF NAME
ALEXANDER BARNA
SCRATCH-RESISTANT MOLDED PRODUCT AND
METHOD OF MANUFACTURE
Filed March 18, 1958
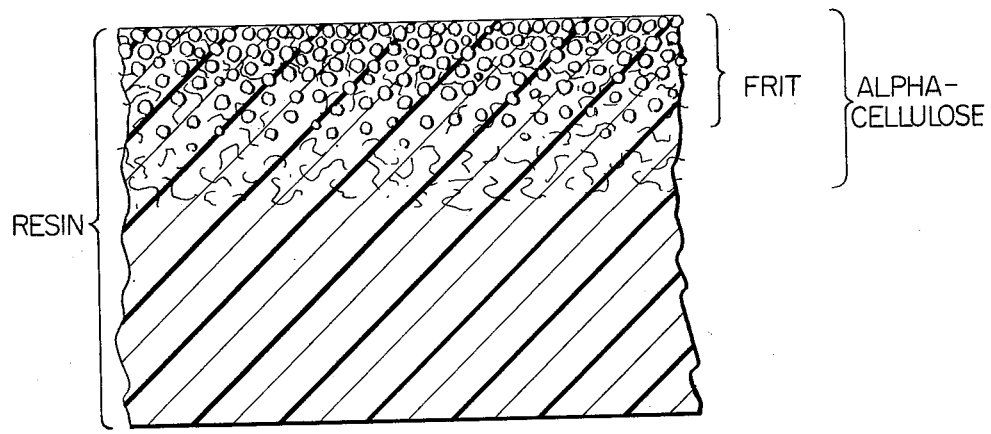
INVENTOR.
SÁNDOR BARNA
BY
ATTORNEYS 3,123,515
SCRATCH-RESISTANT MOLDED PRODUCT AND
METHOD OF MANUFACTURE
Sándor Barna, now by judicial change of name to Alexander Barna, 23910 Wimbledon Road, Shaker Heights, Ohio
Filed Mar. 18, 1958, Ser. No. 722,224
11 Claims. (Cl. 161—162)

This invention relates to new plastic products, more particularly, molded resin products, having improved scratch resistance, and to methods for making such improved products.

Although articles made from molded resins such as thermosetting resins have been available for a number of years, such articles have not been completely satisfactory in uses where resistance to scratching is important.

This has been particularly true in the plastic dinnerware industry and has been one of the major deterrents to more widespread acceptance of plastic dinnerware. In use, the dishware comes in contact with sharp knives and forks which tend to scratch the surface of the dishes. The resulting scratches not only make the dishes unacceptable from an appearance standpoint, but also, the scratches tend to collect food which is difficult to remove, and thus require the use of harsh materials such as metal scouring pads which further contribute to the scratching.

Another problem in connection with the use of plastic dinnerware has been the tendency of the dinnerware to be stained and discolored by food such as coffee, and by strong washing products.

Attempts to improve the scratch resistance of molded resins by modification of the resin with other materials have not been entirely successful for a number of reasons among which are brittleness, poor color, difficulties in molding, high cost, and the like.

However, it has now been found in accordance with the present invention, that molded resin products, and particularly thermosetting resin products, having the previously desired but unattainable scratch resistance, can be produced from conventional molding resins and by conventional molding methods, without appreciably increasing the cost of the final products and without significantly complicating the manufacturing process. In addition, plastic dinnerware produced according to the present invention not only has greatly improved scratch resistance, but also has more china-like appearance, touch and sound characteristics. In addition, the resistance to staining is improved.

The invention will be more fully described with respect to the accompanying drawing, the relative proportions being greatly enlarged and somewhat exaggerated to show the location of the various strata.

The new scratch-resistant molded products of the present invention are cured resin bodies having an outer layer of a fibrous material containing finely divided frit.

The products of the present invention are advantageously made by laminating to a molded, but only partially polymerized, resin body, a fibrous sheet impregnated with a mixture of finely divided frit and a partially polymerized resin. Partially polymerized resins are commonly referred to as B-stage resins. Among the thermosetting resins which may be employed both in the molded body and the impregnated sheet are, for example, melamine-formaldehyde resins, phenol-formaldehyde resins, phenol-furfural resins, urea-formaldehyde resins, alkyd resins, epoxy resins, modifications of such resins, and the like. The resins selected for the molded body may be employed alone or in combination with fillers.

Suitable fibrous materials which may be used in the preparation of the impregnated fibrous sheets are, for example, paper, cloth, alpha-cellulose sheets, matted sheets of other fibrous materials such as asbestos, cotton flock, and the like.

The finely divided frit employed in accordance with the present invention may be one or more of the commercially available frits, such as are employed in the glazing of chinaware. If desired, the frits may contain coloring or opacifying agents. The particle size of the frits may be varied depending upon the proportion of frit in the impregnating composition and the degree of surface smoothness desired in the final product. Generally, the particle size of the frit should be such that it will pass through about a 10 mesh screen. In the production of dinnerware, frit which will pass through about a 30 mesh screen is preferred.

The fibrous sheets may be impregnated by any of the conventional impregnation methods such as dipping, spraying, etc. The impregnating composition is prepared by suspending a mixture of the finely divided, partially polymerized resin particles and the finely divided frit in an aqueous solution. To insure that the resin and frit are uniformly distributed through the suspension, it is preferable to prepare the suspension in a blender. Advantageously, an alcohol such as methanol, ethanol, isopropanol, etc. may be added to the suspension of the resin and frit.

The amount of resin and frit in the impregnated fibrous sheet may vary over a considerable range depending upon the relative proportions of resin and frit and the degree of surface hardness desired in the final product. Impregnated sheets containing between about 20 and 60%, and preferably 30–40%, by weight of resin and frit, and in which the proportion of frit is between about 35 and 60% of the total solids added, have been found to be particularly advantageous in the production of dinnerware. A typical formulation for a suspension to be employed in the impregnation of alpha-cellulose sheets may contain the following:

| | Percent by weight |
|---|---|
| Melamine-formaldehyde resin | 20 |
| Powdered frit—Ferro Corporation Frit No. 1722 (40 mesh) which is a frit made up of oxides of titanium, boron, sodium and silicon | 20 |
| Water | 36 |
| Ethyl alcohol | 24 |

The proportion of resin in the frit-resin impregnating suspension may be appreciably reduced in cases where the fibrous sheet previously has been impregnated with resin alone such as in the case of commercially available melamine-formaldehyde resin-impregnated alpha-cellulose sheets.

The impregnated fibrous sheets are generally laminated to a compatible supporting surface as part of the molding operation. For example, a resinous core is pressed to the desired shape in a curing mold, but before the curing of the resin in the core is completed, the mold is opened to insert the impregnated sheet. Prior to insertion in the mold, the impregnated sheets are cut to the size and shape of the resin core. After the mold is opened, the impregnated cut-out is placed in contact with the surface of the core. The impregnated cut-out may be used on one or both sides of the core, although generally, the cut-out is placed only on the surface which will be exposed to abrasion and wear. The mold is then closed and the impregnated cut-out bonded to the resin core by the application of heat and/or pressure. At the same time, the polymerization and curing of the resin both in the core and the cut-out is also completed. The time required to complete the curing and bond the cut-out as an integral part of the core will depend upon the temperatures and pressures employed and the type of resin chosen.

Melamine-formaldehyde resin molded products made according to the above procedure have a hard surface finish as compared with conventional melamine-formaldehyde resin molded products. Whereas the conventional products have a surface hardness of about 2.0–2.5 on the Mohs scale, the product of the present invention has a surface hardness of about 5. In a comparison of the two samples from an aesthetic viewpoint, dinnerware made according to the present invention has a china-like appearance and is much more pleasing to the eye and touch. Also, the sound produced when the frit-impregnated surfaces come in contact with other objects, more closely resembles the sound associated with chinaware.

Thus, the frit-impregnated products of the present invention achieve the previously desired but unattainable scratch resistance in thermosetting products while using conventional molding resins and conventional molding operations.

From the above description, it will be apparent to one skilled in the art that various modifications can be made within the scope of the present invention. Therefore, the invention is to be restricted only by the following claims.

What is claimed is:

1. A scratch-resistant, molded product comprising a resin body having an outer layer of a fibrous material impregnated with finely divided frit to produce a hard surface on said molded product.

2. A scratch-resistant, molded product comprising a cured thermosetting resin body having an outer layer of a fibrous material impregnated with a mixture of said resin and finely divided frit to produce a hard surface on said molded product.

3. A scratch-resistant, molded product comprising a cured thermosetting resin body having as a laminated outer layer a fibrous sheet impregnated with a mixture of said resin and finely divided frit to produce a hard surface on said molded product.

4. A scratch-resistant, molded product comprising a cured thermosetting resin body having as a laminated outer layer a fibrous sheet impregnated with a mixture of said resin and finely divided frit to produce a hard surface on said molded product, said frit being of a size which will pass through a 10 mesh screen.

5. A scratch-resistant, molded product comprising a cured thermosetting resin body having as a laminated outer layer a fibrous sheet impregnated with a mixture of said resin and finely divided frit to produce a hard surface on said molded product, said frit being of a size which will pass through a 10 mesh screen, and said resin-frit mixture comprising between about 20% and 60% by weight of said impregnated sheet.

6. A scratch-resistant, molded product comprising a cured melamine-formaldehyde resin body having as a laminated outer layer a fibrous sheet impregnated with a mixture of said resin and finely divided frit to produce a hard surface on said molded product, said frit being of a size which will pass through a 30 mesh screen, said resin-frit mixture comprising between about 20% and 60% by weight of said impregnated sheet, and said frit comprising between about 35% and 65% by weight of the solids in said resin-frit mixture.

7. A method for producing a scratch-resistant, molded product comprising the steps of impregnating a fibrous sheet with a mixture of finely divided frit and finely divided, partially polymerized resin particles, and laminating the resulting impregnated sheet with a molded resin body in which the resin has been only partially polymerized.

8. A method for producing a scratch-resistant, molded product comprising the steps of impregnating a fibrous sheet with an aqueous suspension of a mixture of finely divided frit and finely divided, partially polymerized, thermosetting resin particles, and laminating the resulting impregnated sheet on the surface of a molded thermosetting resin body in which the resin has been only partially polymerized.

9. A method for producing a scratch-resistant, molded product comprising the steps of impregnating an alpha-cellulose sheet with an aqueous suspension of a mixture of finely divided frit and finely divided, partially polymerized, thermosetting resin particles, and laminating the resulting impregnated sheet on the surface of a molded thermosetting resin body in which the resin has only been partially polymerized, said frit being of a size which will pass through a 10 mesh screen.

10. A method for producing a scratch-resistant, molded product comprising the steps of impregnating an alpha-cellulose sheet with an aqueous suspension of a mixture of finely divided frit and finely divided, partially polymerized, thermosetting resin particles, and laminating the resulting impregnated sheet on the surface of a molded thermosetting resin body in which the resin has only been partially polymerized, said frit being of a size which will pass through a 10 mesh screen, and said resin-frit mixture comprising between about 20% and 60% by weight of said impregnated sheet.

11. A method for producing a scratch-resistant, molded product comprising the steps of impregnating an alpha-cellulose sheet with an aqueous suspension of a mixture of finely divided frit and finely divided, partially polymerized, melamine-formaldehyde resin particles, and laminating the resulting impregnated sheet on the surface of a molded melamine-formaldehyde resin body in which the resin has only been partially polymerized, said frit being of a size which will pass through a 30 mesh screen, and said resin-frit mixture comprising between about 20% and 60% by weight of said impregnated sheet.

References Cited in the file of this patent

UNITED STATES PATENTS

| | | |
|---|---|---|
| 1,825,877 | Loetscher | Oct. 6, 1931 |
| 2,293,914 | Nanfeldt | Aug. 25, 1942 |
| 2,646,380 | Barlow et al. | July 21, 1953 |
| 2,724,868 | Kish | Nov. 29, 1955 |
| 2,794,760 | Wilson | July 4, 1957 |